United States Patent
Sekine

(10) Patent No.: US 9,703,724 B2
(45) Date of Patent: Jul. 11, 2017

(54) INFORMATION PROCESSING APPARATUS, INFORMATION PROCESSING METHOD, AND RECORDING MEDIUM

(71) Applicant: CANON KABUSHIKI KAISHA, Tokyo (JP)

(72) Inventor: Hiroshi Sekine, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/956,922

(22) Filed: Dec. 2, 2015

(65) Prior Publication Data

US 2016/0162420 A1    Jun. 9, 2016

(30) Foreign Application Priority Data

Dec. 5, 2014   (JP) .................. 2014-246723

(51) Int. Cl.
   *G06F 12/14*   (2006.01)
   *G06F 12/02*   (2006.01)
   *G06F 21/31*   (2013.01)
   *G06F 21/79*   (2013.01)

(52) U.S. Cl.
   CPC ...... *G06F 12/1425* (2013.01); *G06F 12/0246* (2013.01); *G06F 21/31* (2013.01); *G06F 21/79* (2013.01); *G06F 2212/1052* (2013.01); *G06F 2212/7207* (2013.01); *G06F 2212/7209* (2013.01)

(58) Field of Classification Search
   None
   See application file for complete search history.

(56) References Cited

FOREIGN PATENT DOCUMENTS

JP    2011-48861 A    3/2011

*Primary Examiner* — Kevin Verbrugge
(74) *Attorney, Agent, or Firm* — Canon USA, Inc., IP Division

(57) ABSTRACT

A deletion instruction of data stored in a nonvolatile memory is input, a determination is made whether the nonvolatile memory has reached an end of its rewrite operating life in accordance with the input deletion instruction, an instruction for setting a password to the nonvolatile memory is accepted when it is determined that the nonvolatile memory has reached the end of its rewrite operating life, and the password is set to the nonvolatile memory in accordance with the accepted instruction.

9 Claims, 4 Drawing Sheets

INFORMATION PROCESSING APPARATUS, INFORMATION PROCESSING METHOD, AND RECORDING MEDIUM

BACKGROUND

Field

Aspects of the present invention generally relate to an information processing apparatus, an information processing method, and a recording medium storing a program.

Description of the Related Art

A technology for confidentiality preservation of data stored in a nonvolatile memory provided to an information processing apparatus has been proposed with which input of a password is requested in a case where the data in the nonvolatile memory is accessed, and the data stored in the nonvolatile memory is deleted in a case where the password is not matched with a predetermined password (for example, Japanese Patent Laid-Open No. 2011-48861).

However, according to a method described in Japanese Patent Laid-Open No. 2011-48861, in a case where the data is unable to be deleted because the nonvolatile memory has reached an end of its operating life, a problem occurs that a confidentiality preservation level is decreased.

SUMMARY OF THE INVENTION

Aspects of the present invention have been made provide a scheme with which, in a case where the nonvolatile memory has reached the end of its operating life, and the internal data is unable to be deleted, it is possible, for example, to avoid the decrease in the confidentiality preservation level of the nonvolatile memory by setting a password when the nonvolatile memory is discarded.

According to an aspect of the present invention, an information processing apparatus includes an input unit configured to input a deletion instruction of data stored in a nonvolatile memory, a determination unit configured to determine whether the nonvolatile memory has reached an end of its rewrite operating life in accordance with the deletion instruction input by the input unit, an acceptance unit configured to accept an instruction for setting a password to the nonvolatile memory in a case where the determination unit determines that the nonvolatile memory has reached the end of its rewrite operating life, and a setting unit configured to set the password to the nonvolatile memory in accordance with the instruction accepted by the acceptance unit.

Further features of the present disclosure will become apparent from the following description of exemplary embodiments with reference to the attached drawings.

DESCRIPTION OF THE EMBODIMENTS

Next, exemplary embodiments will be described with reference to the drawings.

Descriptions of System Configuration

First Exemplary Embodiment

Figure 1:
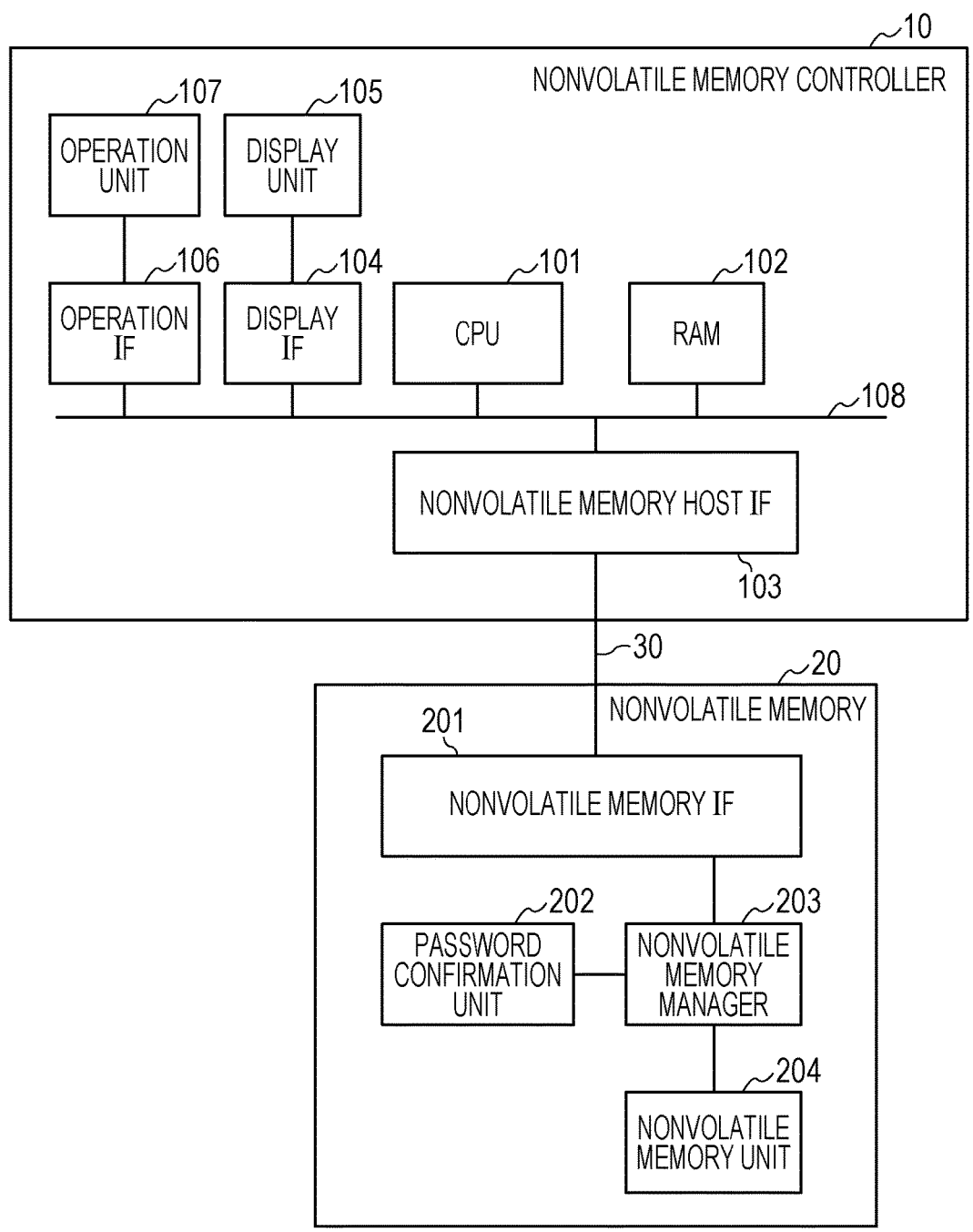
FIG. 1 is a block diagram for describing a configuration of an information processing apparatus.

FIG. 1 is a block diagram for describing a configuration of an information processing apparatus according to a first exemplary embodiment. According to the present exemplary embodiment, a nonvolatile memory controller will be used as an example of the information processing apparatus. In the present example, a nonvolatile memory unit 204 that has a rewrite operating life for performing read and write will be used as an example of a nonvolatile memory.

In FIG. 1, a nonvolatile memory controller 10 is connected to a nonvolatile memory 20 corresponding to an example of a memory unit via a bus 30. A CPU 101 of the nonvolatile memory controller 10 is a controller configured to control the entire nonvolatile memory controller 10 and performs various computing operations and the like. A RAM 102 is a system work memory used for the CPU 101 to operate. Data and programs are expanded in the RAM 102 from the nonvolatile memory 20 or the like and used by the CPU 101 to perform the computing operations, various controls, and the like. A nonvolatile memory host IF 103 controls the nonvolatile memory 20 via the bus 30 in response to the control of the CPU 101. A display IF 104 is connected to a display unit 105 and transmits a display signal to the display unit 105. The display unit 105 includes a liquid crystal panel, an LED, or the like and is used as a part for displaying information to a user. An operation IF 106 is connected to an operation unit 107, and the operation unit 107 includes a touch panel, a button, or the like. The operation IF 106 accepts a user operation from the operation unit 107 as an electric signal. These modules are connected with one another via a controller bus 108.

The nonvolatile memory 20 includes a nonvolatile memory IF 201, a password confirmation unit 202, a nonvolatile memory manager 203, and the nonvolatile memory unit 204. The nonvolatile memory IF 201 is connected to the nonvolatile memory controller 10 via the bus 30. The nonvolatile memory IF 201 receives a command from the nonvolatile memory controller 10 and transmits data or a response to the nonvolatile memory controller 10 via the bus 30 in response to the received command.

The received command includes a deletion command, a write command, a read command, a password setting command, and the like. The nonvolatile memory manager 203 is connected to the nonvolatile memory unit 204 and the password confirmation unit 202. The nonvolatile memory manager 203 interprets the command received by the nonvolatile memory IF 201 functioning as a communication unit, and in the case of the deletion command, deletes data recorded in the nonvolatile memory unit 204. Here, in the case of the write command, the nonvolatile memory manager 203 writes the data received in the nonvolatile memory IF 201 from the nonvolatile memory controller 10 via the bus 30 in the nonvolatile memory unit 204.

In the case of the read command, the nonvolatile memory manager 203 reads the data from the nonvolatile memory unit 204, and transmits the read data to the nonvolatile memory controller 10 from the nonvolatile memory IF 201 via the bus 30. In the case of the password setting command, the nonvolatile memory manager 203 records a password received from the nonvolatile memory controller 10 via the bus 30 in the password confirmation unit 202. The password confirmation unit 202 has a password lock setting. In a case where a power source of the nonvolatile memory 20 is turned ON in a state in which the password is recorded, a password lock is set as ON. On the other hand, in a case where a password that is matched with a password recorded in the password confirmation unit 202 is received from the nonvolatile memory host IF 103, the password lock is set as OFF.

In addition, the password lock is set as ON in a case where a password lock command is received from the nonvolatile memory host IF 103 in a state in which the password lock is in an OFF state.

On the other hand, in a case where the deletion command, the write command, or the read command is received from the nonvolatile memory controller 10 when the password lock is ON, the nonvolatile memory controller 10 is notified via the bus 30 that the password lock is in an ON state.

As the number of times to perform a rewrite or deletion operation increases, a data recording area of the nonvolatile memory unit 204 comes closer to an end of its operating life. In a case where the operating life has reached the end, '1' is set for an operating life flag managed in the nonvolatile memory manager 203. Herein, in a state in which the operating life flag is '1', the nonvolatile memory manager 203 is notified of the deletion command or the write command from the nonvolatile memory controller 10. Then, the nonvolatile memory manager 203 controls the nonvolatile memory IF 201, and the nonvolatile memory 20 issues a rewrite deletion end-of-life notification to the nonvolatile memory controller 10 via the bus 30.

Figure 2:
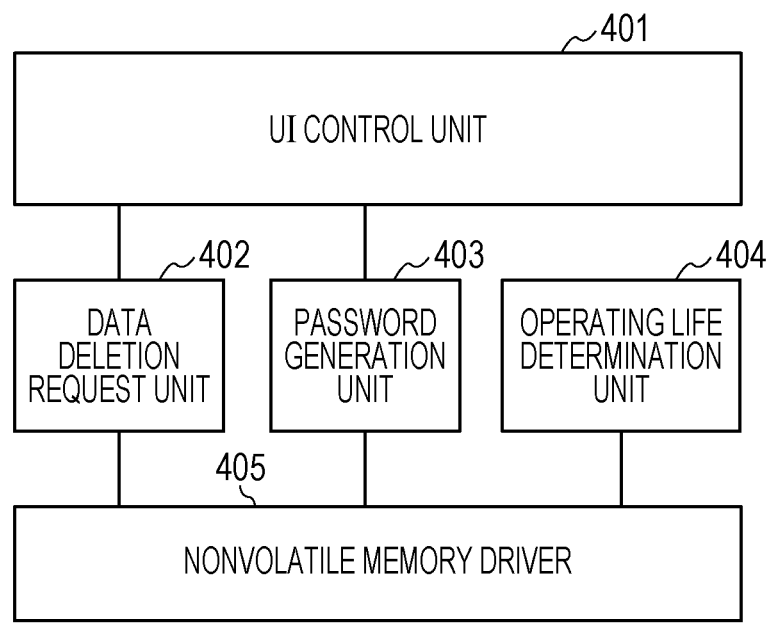
FIG. 2 illustrates a software configuration of a nonvolatile memory controller.

FIG. 2 illustrates a software configuration of the nonvolatile memory controller 10 illustrated in FIG. 1.

In FIG. 2, a UI control unit 401 is a control program for controlling the display IF 104 to notify a user of information on the display unit 105. The UI control unit 401 accepts a user operation from the operation unit 107 by the operation IF 106 and issues a notification to a data deletion request unit 402 and a password generation unit 403 based on the accepted operation.

When the notification from the UI control unit 401 is received, the data deletion request unit 402 notifies a nonvolatile memory driver 405 of a data deletion request. The nonvolatile memory driver 405 that has received the data deletion request controls the nonvolatile memory host IF 103 and issues the deletion command to the nonvolatile memory 20 via the bus 30.

The password generation unit 403 receives the notification from the UI control unit 401 to generate a password and notifies the nonvolatile memory driver 405 of the password. The nonvolatile memory driver 405 controls the nonvolatile memory host IF 103 and transmits the password setting command to the nonvolatile memory 20 via the bus 30.

In a case where the nonvolatile memory driver 405 receives the rewrite deletion end-of-life notification when the deletion command is issued to the nonvolatile memory 20, an operating life determination unit 404 receives the notification from the nonvolatile memory driver 405. Then, the operating life determination unit 404 determines that the nonvolatile memory 20 has reached the end of its operating life and issues a nonvolatile memory end-of-life notification to the UI control unit 401. When the nonvolatile memory end-of-life notification from the operating life determination unit 404 is received, the UI control unit 401 informs the user of a state in which data deletion is unable to be performed.

Figure 3:
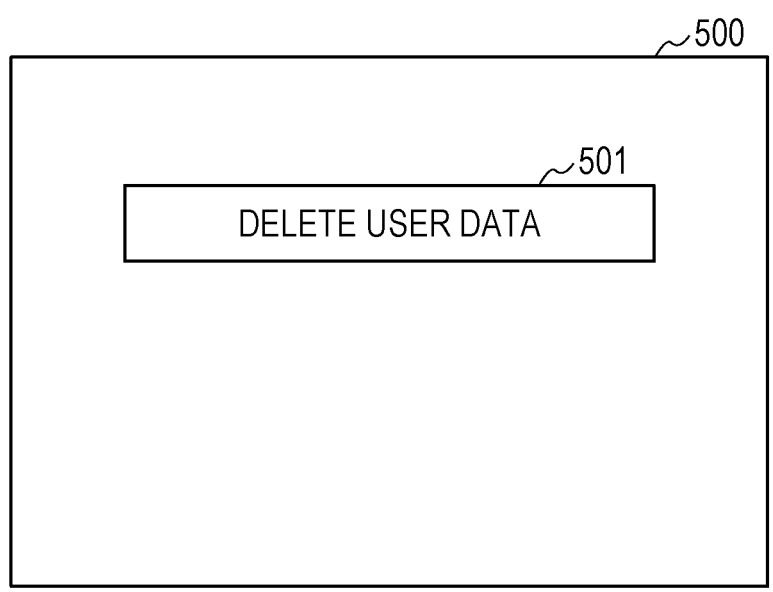
FIG. 3 illustrates an example of a UI screen displayed on a display unit.

FIG. 3 is an example of a UI screen displayed on the display unit 105 illustrated in FIG. 1. This UI screen is a display screen example for user data deletion.

In FIG. 3, a user data deletion screen 500 is displayed on the display unit 105 in a case where the user data is deleted by a user operation. When the user presses a user data deletion button 501 displayed on the user data deletion screen 500, the UI control unit 401 notifies the data deletion request unit 402 of this state.

Figure 4:
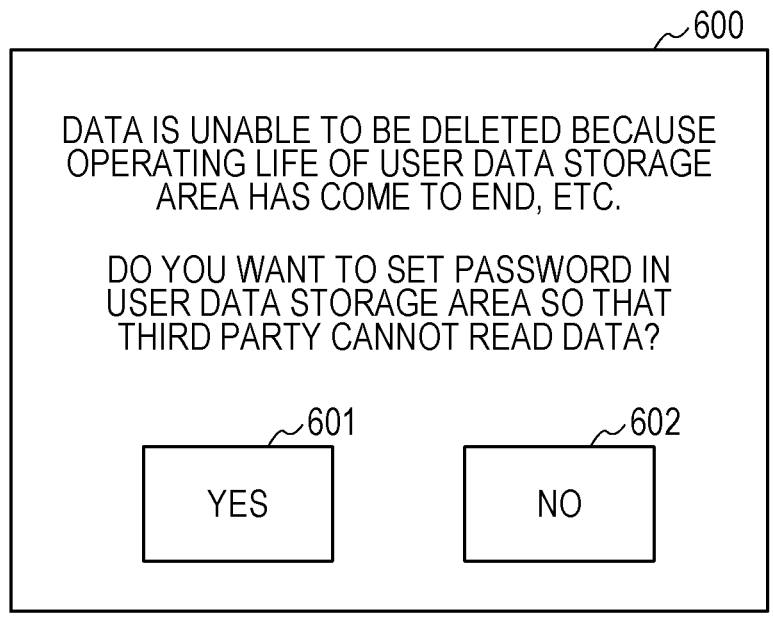
FIG. 4 illustrates an example of the UI screen displayed on the display unit.

FIG. 4 is an example of the UI screen displayed on the display unit 105 illustrated in FIG. 1. This UI screen is a display screen example when the user data is unable to be deleted.

In FIG. 4, a user data deletion prohibition display screen 600 is displayed on the display unit 105 in a case where the nonvolatile memory end-of-life notification is accepted from the nonvolatile memory 20.

Herein, the UI control unit 401 detects that the user presses the user data deletion button 501 on the user data deletion screen 500. Then, the UI control unit 401 notifies the data deletion request unit 402 of this state, and the data deletion request unit 402 notifies the nonvolatile memory driver 405 of the data deletion request.

The nonvolatile memory driver 405 that has received the data deletion request controls the nonvolatile memory host IF 103 and issues the deletion command to the nonvolatile memory 20.

Thereafter, when it is determined that the nonvolatile memory 20 notifies the nonvolatile memory host IF 103 of the rewrite deletion end-of-life notification, the nonvolatile memory driver 405 notifies the operating life determination unit 404 of the state, and the operating life determination unit 404 issues the nonvolatile memory end-of-life notification. The UI control unit 401 that has received the nonvolatile memory end-of-life notification controls the display IF 104 and displays the user data deletion prohibition display screen 600 on the display unit 105.

In a case where the user presses a YES button 601 on the user data deletion prohibition display screen 600, a password setting screen 700 that will be described below is displayed. In a case where the user presses a NO button 602, a home screen that is not illustrated in the drawings herein is displayed.

Figure 5:
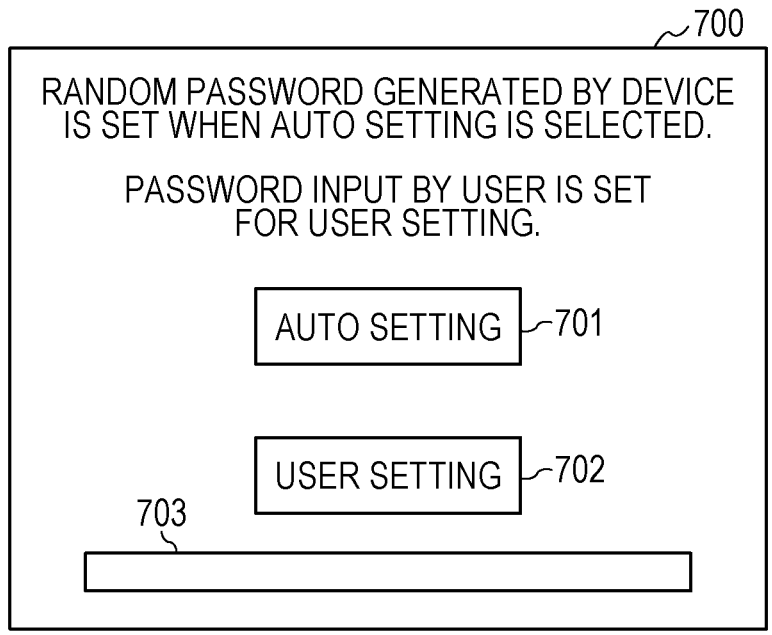
FIG. 5 illustrates an example of the UI screen displayed on the display unit.

FIG. 5 is an example of the UI screen displayed on the display unit 105 illustrated in FIG. 1. This UI screen is a password setting screen example when the user data is unable to be deleted.

In FIG. 5, the password setting screen 700 is displayed when the YES button 601 is pressed on the user data deletion prohibition display screen 600. Herein, when it is detected that the user presses an auto setting button 701, the UI control unit 401 issues an auto setting notification to the password generation unit 403, and a password is automatically generated for setting whether or not a request with respect to the nonvolatile memory 20 is permitted. The password in this case is a password automatically generated by a known random number generator or the like, and no password is preferably held on the nonvolatile memory controller.

Accordingly, the configuration in which the password is automatically generated is beneficial to a case where the user will not use this system again, such as a case where the system including the nonvolatile memory 20 is discarded. It should be noted that the nonvolatile memory driver 405 is notified of the password generated by the password generation unit 403, and the nonvolatile memory driver 405 controls the nonvolatile memory host IF 103 to issue the password setting command to the nonvolatile memory 20.

A password input box 703 is an input box for inputting a user setting password, and a user setting button 702 is pressed in a state in which the password has been input into the password input box 703. Then, the password generation unit 403 is notified of the user setting password from the UI control unit 401, and the nonvolatile memory driver 405 is notified of the user setting password from the password generation unit 403. The nonvolatile memory driver 405 controls the nonvolatile memory host IF 103 to issue the password setting command to the nonvolatile memory 20.

Figure 6:
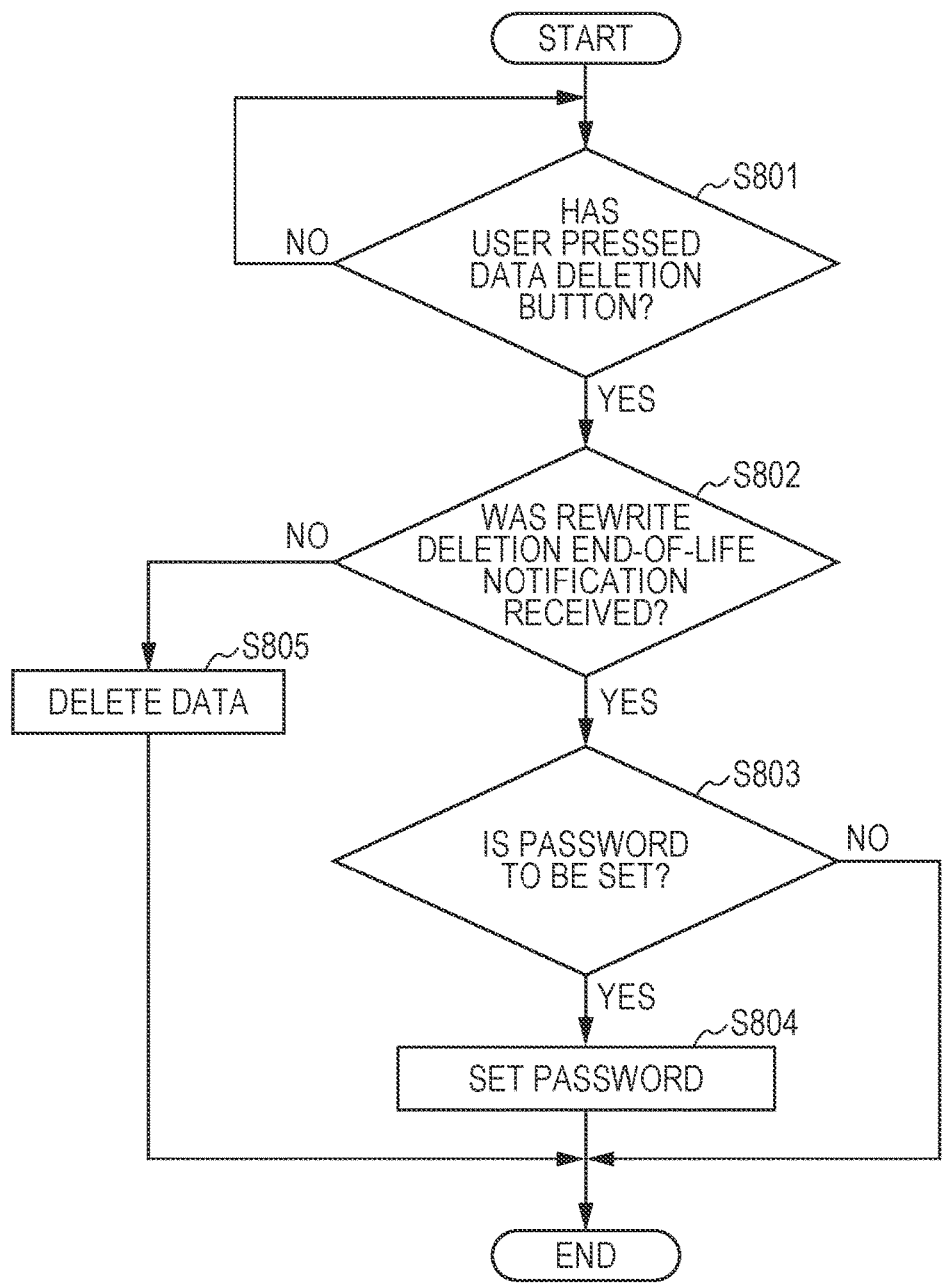
FIG. 6 is a flow chart for describing a memory control method of the information processing apparatus.

FIG. 6 is a flow chart for describing a memory control method of the information processing apparatus according to the present exemplary embodiment. Respective steps of the present example are realized while the CPU 101 loads a control program stored in a memory that is not illustrated in the drawings such as, for example, a ROM or an external memory to the RAM 102 to be executed. Hereinafter, descriptions will be given of control while software of the nonvolatile memory controller 10 is set as a main subject.

In S801, the flow stands by until the user data deletion button 501 on the user data deletion screen 500 is pressed. In a case where the UI control unit 401 determines that the user data deletion button 501 is pressed, the flow proceeds to S802. In S802, in a case where the CPU 101 determines that the rewrite deletion end-of-life notification is received from the nonvolatile memory 20, the flow proceeds to S803. On the other hand, in a case where the CPU 101 determines that the rewrite deletion end-of-life notification is not received, the flow stands by until the data deletion is ended in S805, and in a case where the data deletion is ended, the flow ends as is.

In S803, the user is asked if the data stored in the nonvolatile memory unit 204 is put into a state in which read or write is unable to be performed. Thus, the UI control unit 401 displays the user data deletion prohibition display screen 600 on the display unit 105. In a case where the UI control unit 401 determines that the NO button 602 is pressed, the flow ends as is. On the other hand, in a case where the UI control unit 401 determines that the YES button 601 is pressed, the flow proceeds to S804.

In S804, the password setting screen 700 is displayed. When it is determined that the auto setting button 701 or the user setting button 702 is pressed, the nonvolatile memory host IF 103 transmits the password setting command to the nonvolatile memory 20 and sets the password lock in the nonvolatile memory 20 to end the processing.

The exemplary embodiment can also be realized while a program for realizing one or more functions according to the above-described exemplary embodiment is supplied to a system or an apparatus via a network or a storage medium, and one or more processors in a computer of the system or the apparatus reads out and executes the program. In addition, the exemplary embodiment can be realized by a circuit (for example, ASIC) that realizes one or more functions.

Other Embodiments

Additional embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-246723, filed Dec. 5, 2014, which is hereby incorporated by reference herein in its entirety.

What is claimed is:

1. An information processing apparatus, comprising:
an input unit configured to input a deletion instruction of data stored in a nonvolatile memory;
a determination unit configured to determine whether the nonvolatile memory has reached an end of its rewrite operating life in accordance with the deletion instruction input by the input unit;
an acceptance unit configured to accept an instruction for setting a password to the nonvolatile memory in a case where the determination unit determines that the nonvolatile memory has reached the end of its rewrite operating life; and
a setting unit configured to set the password to the nonvolatile memory in accordance with the instruction accepted by the acceptance unit.

2. The information processing apparatus according to claim 1, wherein the determination unit determines whether the nonvolatile memory has reached the end of its rewrite operating life based on a number of data writes to the nonvolatile memory.

3. The information processing apparatus according to claim 1, wherein the determination unit determines that the nonvolatile memory has reached the end of its rewrite operating life in a case where the data stored in the nonvolatile memory is unable to be deleted in accordance with the deletion instruction.

4. The information processing apparatus according to claim 1, wherein the password is generated using a random number.

5. The information processing apparatus according to claim 1, wherein the password is generated based on information input by a user.

6. An information processing apparatus, comprising:
an acceptance unit configured to accept a deletion instruction to delete data stored in a nonvolatile memory;

an overwrite deletion unit configured to perform overwrite deletion of data stored in the nonvolatile memory in accordance with the deletion instruction; and a setting unit configured to set a password to the nonvolatile memory in a case where the overwrite deletion of data stored in the nonvolatile memory is unable to be performed by the overwrite deletion unit.

7. An information processing apparatus, comprising:

an acceptance unit configured to accept a deletion instruction to delete data stored in a nonvolatile memory;

an overwrite deletion unit configured to perform overwrite deletion of data stored in the nonvolatile memory in accordance with the deletion instruction; and a setting unit configured to set a password to the nonvolatile memory when a number of times the overwrite deletion unit performs on overwrite deletion is greater than or equal to a predetermined number.

8. An information processing method, comprising:

inputting a deletion instruction of data stored in a nonvolatile memory;

determining whether the nonvolatile memory has reached an end of its rewrite operating life in accordance with the input deletion instruction;

accepting an instruction for setting a password to the nonvolatile memory when it is determined that the nonvolatile memory has reached the end of its rewrite operating life; and setting the password to the nonvolatile memory in accordance with the accepted instruction.

9. A non-transitory computer-readable recording medium storing computer executable instructions that cause a computer to execute an information processing method, the information processing method comprising:

inputting a deletion instruction of data stored in a nonvolatile memory;

determining whether the nonvolatile memory has reached an end of its rewrite operating life in accordance with the input deletion instruction;

accepting an instruction for setting a password to the nonvolatile memory when it is determined that the nonvolatile memory has reached the end of its rewrite operating life; and setting the password to the nonvolatile memory in accordance with the accepted instruction.

\* \* \* \* \*